(12) United States Patent
Nakai et al.

(10) Patent No.: US 6,885,401 B1
(45) Date of Patent: Apr. 26, 2005

(54) CLOCK SIGNAL GENERATOR FOR SOLID-STATE IMAGING APPARATUS

(75) Inventors: Tomomichi Nakai, Ogaki (JP); Toshio Nakakuki, Gifu-ken (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/495,427

(22) Filed: Jan. 31, 2000

(30) Foreign Application Priority Data

Feb. 1, 1999 (JP) ........................................... 11-023883

(51) Int. Cl.⁷ ........................... H04N 3/14; H04N 5/335; H04N 9/64; H01L 27/00
(52) U.S. Cl. ..................... 348/312; 348/248; 250/208.1
(58) Field of Search .............................. 348/312, 222.1, 348/229.1, 230.1, 294, 296, 311, 317, 322, 248, 249; 250/208.1

(56) References Cited

U.S. PATENT DOCUMENTS

| | | | | |
|---|---|---|---|---|
| 4,484,224 A | * | 11/1984 | Sato et al. ................... | 348/312 |
| 4,686,571 A | * | 8/1987 | Suzuki ..................... | 348/230.1 |
| 4,704,633 A | * | 11/1987 | Matsumoto ................. | 348/255 |
| 4,803,555 A | * | 2/1989 | Shinbori et al. ............ | 348/314 |
| 4,821,105 A | * | 4/1989 | Suga et al. ................. | 348/220.1 |
| 5,040,070 A | * | 8/1991 | Higashitsutsumi et al. . | 348/298 |
| 5,489,945 A | * | 2/1996 | Kannegundla et al. ...... | 348/521 |
| 5,515,103 A | * | 5/1996 | Ito ............................. | 348/312 |
| 5,731,833 A | * | 3/1998 | Watanabe .................. | 348/241 |
| 5,909,246 A | * | 6/1999 | Terashima .................. | 348/298 |
| 6,618,085 B2 | * | 9/2003 | Ishimoto .................... | 348/294 |
| 6,774,350 B2 | * | 8/2004 | Okada ..................... | 250/208.1 |
| 2001/0050715 A1 | * | 12/2001 | Sanpei ....................... | 348/312 |

* cited by examiner

*Primary Examiner*—Wendy R. Garber
*Assistant Examiner*—John Villecco
(74) *Attorney, Agent, or Firm*—Sheridan Ross PC

(57) ABSTRACT

A frame transfer type solid-state imaging apparatus has a matrix of pixels which store information charges corresponding to a received image. The information charges are moved from the pixels to vertical transfer registers, and then to a horizontal transfer register, prior to being stored. A timing control circuit generates a vertical scan timing signal and a horizontal scan timing signal using a divided clock signal. A horizontal drive circuit generates a horizontal transfer clock using the divided clock signal and the horizontal scan timing signal. The horizontal transfer clock is used to move the information charges from the vertical transfer registers to the horizontal transfer register. A vertical drive circuit generates a vertical transfer clock using a reference clock signal and the vertical scan timing signal. The vertical transfer clock is used to move the information charges from the pixels to the vertical transfer registers. The divided clock signal is generated by dividing the reference clock signal by a predetermined ratio, such that the divided clock signal is longer than the reference clock signal. By generating the vertical transfer clock using the reference clock, and not the longer, divided clock, the resulting image does not have an increase in smear components.

5 Claims, 2 Drawing Sheets

CLOCK SIGNAL GENERATOR FOR SOLID-STATE IMAGING APPARATUS

BACKGROUND OF THE INVENTION

The present invention relates to a solid-state imaging apparatus having a frame transfer or frame interline type solid-state imaging device.

FIG. 1 is a block diagram showing an imaging apparatus that has a frame transfer type CCD 1 (solid-state imaging device). FIG. 2 is a timing chart illustrating the operation of the imaging apparatus.

The CCD 1 includes a light receiving portion 1a, a storing portion 1b, a horizontal transfer portion 1c, and an output portion 1d. The light receiving portion 1a has a plurality of shift registers arranged parallel to one another in the vertical direction. Each bit of the shift registers forms a light receiving pixel. Each light receiving pixel stores an information charge generated in correspondence with a sensed object. The storing portion 1b has a plurality of shift registers arranged continuously from the shift registers of the light receiving portion 1a. Further, the storing portion 1b temporarily stores information charges that correspond to a single image output by the light receiving portion 1a. The number of bits in each shift register is determined in accordance with the number of bits in the shift registers of the light receiving portion 1a. The horizontal transfer portion 1c has a single shift register, each bit of which is connected to the output of an associated storing portion 1b shift register. Further, the horizontal transfer portion 1c receives the information charges, which correspond to a single image, line by line and sequentially transfers each line of information charges. The output portion 1d has an electrically independent capacitor and an amplifier for extracting fluctuations in the potential of the capacitor. The capacitor receives the information charge from the horizontal transfer portion 1c in units of single pixels. The output portion 1d converts the information charge into a voltage value and generates an image signal Y.

A vertical drive circuit 2, which is operated in accordance with a vertical timing signal VD, generates a vertical transfer clock $\phi v$ from a reference clock MCK, which has a predetermined cycle, and sends the vertical transfer clock $\phi v$ to the light receiving portion 1a and the storing portion 1b. When the light receiving portion 1a receives the vertical transfer clock $\phi v$, the information charges stored in the light receiving pixels are immediately transferred to the storing portion 1b in units of single images. A horizontal drive circuit 3, which is operated in accordance with a horizontal timing signal HD, generates a storage transfer clock $\phi s$ from the reference clock MCK. The horizontal drive circuit 3 simultaneously generates a horizontal transfer clock $\phi h$. The storage transfer clock $\phi s$ is provided to the storing portion 1b together with the vertical transfer clock $\phi v$. When the storing portion 1b receives the storage transfer clock $\phi s$, the information charges stored in the storing portion 1b are transferred to the horizontal transfer portion 1c line by line. The horizontal transfer clock $\phi h$ is provided to the horizontal transfer portion 1c. When the horizontal transfer portion 1c receives the horizontal transfer clock $\phi h$, the information charges transferred to the horizontal transfer portion 1c from the storing portion 1b are sequentially, serially transferred to the output portion 1d.

A timing control circuit 4 includes a horizontal counter and a vertical counter. The horizontal counter divides the reference clock MCK to generate the horizontal timing signal HD. The vertical counter divides this horizontal timing signal HD to generate the vertical timing signal VD. For example, in accordance with the NTSC standards, the timing control circuit 4 divides the reference clock MCK, the frequency of which is 14.32 MHz, by 910 to generate the horizontal timing signal HD and this horizontal timing signal HD by 252.5 to generate the vertical timing signal VD. The horizontal and vertical timing signals HD, VD respectively represent various timing signals related with horizontal scan periods and vertical scan periods.

The CCD 1 repeats imaging operations in cycles corresponding to the vertical timing signal VD and outputs the image signal Y in units of single lines in cycles corresponding to the horizontal timing signal HD during each vertical scan period.

The exposure time of the CCD 1, or the time period during which an information charge is stored in each light receiving pixel, coincides with the vertical scan cycle when an electronic shutter is not operated. Further, the exposure time may normally be varied by discharging the information charges during the vertical scan period, that is, by operating an electronic shutter. If the imaging apparatus does not have television system restrictions, the frequency of the reference clock MCK may be changed to vary the exposure time.

If the sensed object has a low luminance or if the CCD 1 has a low light receiving sensitivity, the frequency of the reference clock MCK is decreased to lengthen the vertical scan cycle in order to obtain sufficient exposure time. However, when the frequency of the reference clock MCK is decreased, the frequency of the vertical transfer clock $\phi v$, which is generated from the reference clock MCK, also decreases. This increases the time required for frame transfer from the light receiving portion 1a to the storing portion 1b and increases smear.

SUMMARY OF THE INVENTION

It is an object of the present invention to provide a solid-state imaging apparatus that minimizes the mixing of smear components during frame transfer even when the exposure time of the imaging device is increased.

To achieve the above object, the present invention provides a solid-state imaging apparatus comprising a solid-state imaging device including a light receiving portion having a plurality of light receiving pixels, a storing portion arranged adjacent to the light receiving portion, and a horizontal transfer portion arranged adjacent to the storing portion. A timing control circuit divides a first clock having a predetermined cycle to generate a vertical scan timing signal and a horizontal scan timing signal. A vertical drive circuit is connected to the timing control circuit for generating a vertical transfer clock from a second clock, the cycle of which is shorter than the first clock, in accordance with the vertical scan timing signal. The vertical transfer clock is used to transfer information charges accumulated in the light receiving pixels of the light receiving portion to the storing portion. A horizontal drive circuit is connected to the timing control circuit for generating a horizontal transfer clock from the first clock in accordance with the horizontal scan timing signal. The horizontal transfer clock is used to output the information charges transferred from the storing portion to the horizontal transfer portion.

A further aspect of the present invention provides a method for driving a solid-state imaging device including a light receiving portion having a plurality of light receiving pixels, a storing portion arranged adjacent to the light receiving portion, and a horizontal transfer portion arranged adjacent to the storing portion. The method includes the steps of dividing a reference clock with a predetermined dividing ratio to generate a divisional clock having a cycle longer than the cycle of the reference clock, generating a vertical scan timing signal and a horizontal scan timing signal from the divisional clock, generating a vertical transfer clock from the reference clock in accordance with the vertical scan timing signal, providing the vertical transfer clock to the light receiving portion and the storing portion in order to transfer information charges accumulated in the light receiving pixels of the light receiving portion to the storing portion, generating a horizontal transfer clock from the divisional clock in accordance with the horizontal scan timing signal, and providing the horizontal transfer clock to the horizontal transfer portion in order to output the information charges transferred from the storing portion to the horizontal transfer portion.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENT

A solid-state imaging apparatus according to the present invention will now be described with reference to FIGS. 3 and 4.

Figure 1:
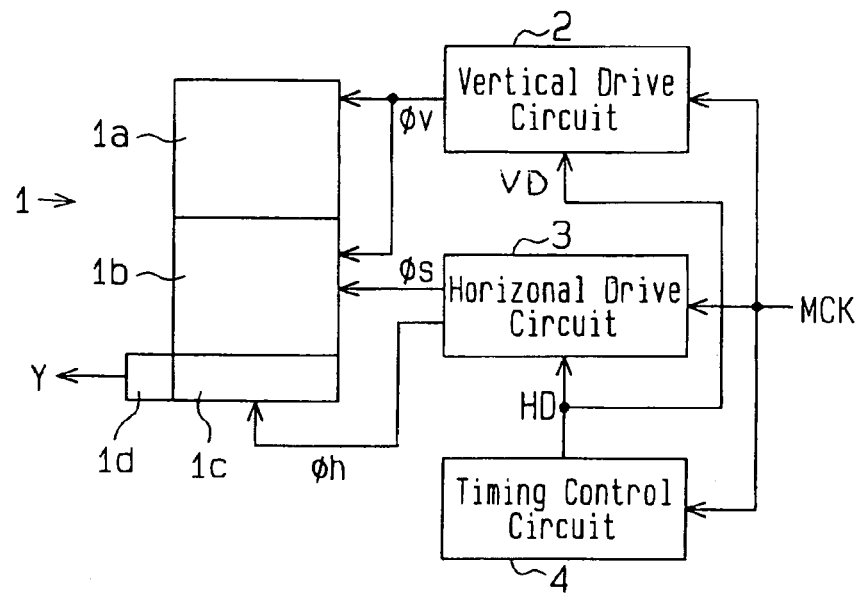
FIG. 1 is a schematic block diagram showing a prior art solid-state imaging apparatus.
Figure 2:
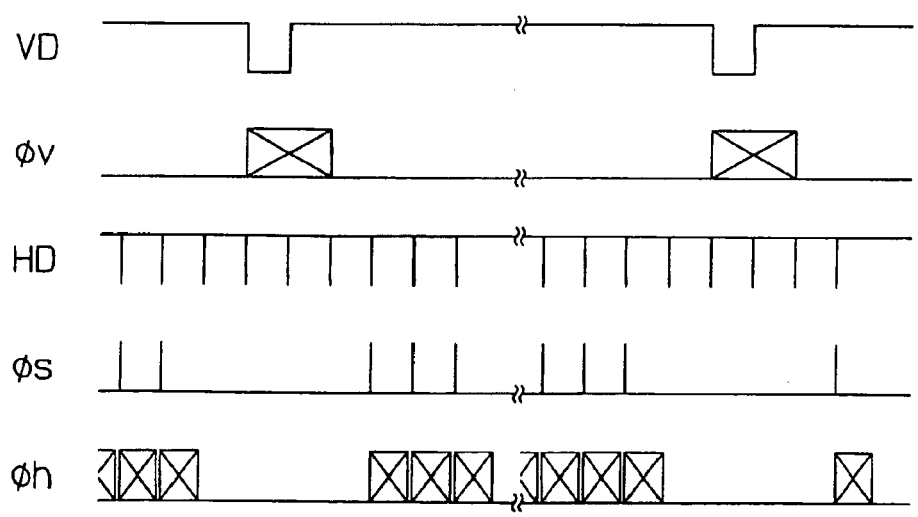
FIG. 2 is a timing chart showing the operation of the solid-state imaging apparatus of FIG. 1.
Figure 3:
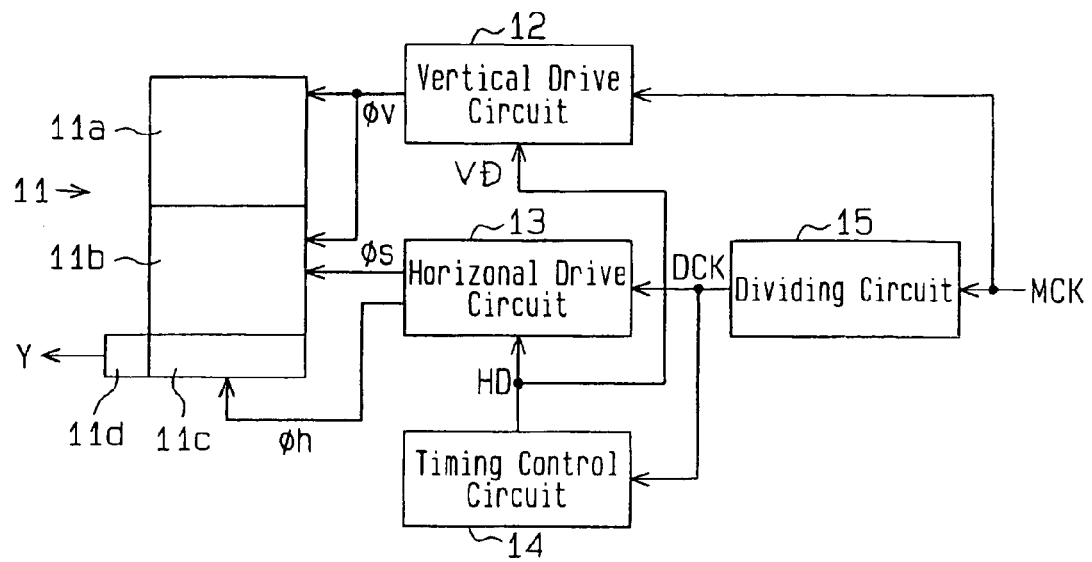
FIG. 3 is a schematic block diagram showing a solid-state imaging apparatus according to the present invention.
Figure 4:
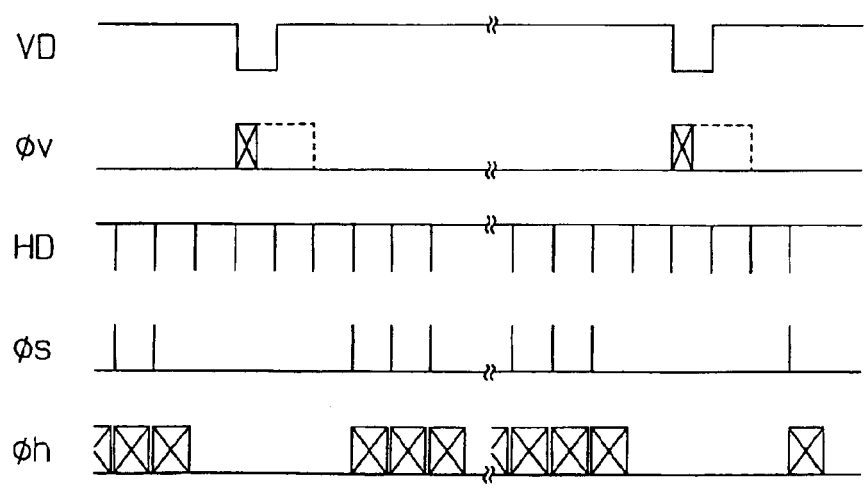
FIG. 4 is a timing chart showing the operation of the solid-state imaging apparatus of FIG. 3.

Referring to FIG. 3, a CCD 11 (solid-state imaging device) includes a light receiving portion 11a, a storing portion 11b, a horizontal transfer portion 11c, and an output portion 11d. The information charges stored in the light receiving portion 11a are transferred to the output portion 11d via the storing portion 11b and the horizontal transfer portion 11c. The output portion 11d generates an image signal Y based on the information charges.

A vertical drive circuit 12, which is operated in accordance with a vertical timing signal VD, generates a vertical transfer clock $\phi$v from a reference clock MCK, which has a predetermined cycle, and sends the vertical transfer clock $\phi$v to the light receiving portion 11a and the storing portion 11b. When the light receiving portion 11a receives the vertical transfer clock $\phi$v, the information charges stored in light receiving pixels are immediately transferred to the storing portion 11b in units of single images.

A horizontal drive circuit 13, which is operated in accordance with a horizontal timing signal HD, generates a storage transfer clock $\phi$s from a divisional clock DCK, which is generated by a frequency dividing circuit 15. The horizontal drive circuit 13 simultaneously generates a horizontal transfer clock $\phi$h. The storage transfer clock $\phi$s is provided to the storing portion 11b. The information charges stored in the storing portion 11b are transferred to the horizontal transfer portion 11c line by line in accordance with the storage transfer clock $\phi$s. The information charges transferred to the horizontal transfer portion 11c from the storing portion 11b are sequentially, serially transferred to the output portion 11d in accordance with the horizontal transfer clock $\phi$h.

A timing control circuit 14 includes a horizontal counter and a vertical counter. The horizontal counter divides the divisional clock DCK to generate the horizontal timing signal HD. The vertical counter divides the horizontal timing signal HD to generate the vertical timing signal VD. The vertical and horizontal timing signals VD, HD are provided to the vertical and horizontal drive circuits 12, 13, respectively.

The dividing circuit 15 divides the reference clock signal MCK with a predetermined dividing ratio to generate the divisional clock DCK. For example, if the dividing circuit 15 divides the frequency of the reference clock MCK into two, the cycles of the vertical timing signal VD and the horizontal timing signal HD generated by the timing control circuit 14 become two times longer. In this case, the frame transfer cycle in the CCD 11 becomes two times longer, and the storing period of the information charges increases by two times. In this state, the vertical drive circuit 12 generates the vertical transfer clock $\phi$v by synthesizing the reference clock MCK that does not pass through the dividing circuit 15. Accordingly, the time required for frame transfer remains short even if the cycle of the vertical timing signal VD becomes long. This prevents smear components from increasing.

In addition to setting the information charge storing time of the CCD 11 in accordance with the cycle of the vertical timing signal VD, the information charge storing time may be set by operating an electronic shutter to temporarily discharge the information charge during the vertical scan period. The dividing ratio of the dividing circuit 15 may be variable so that an appropriate value can be selected to change the information charge storing time of the CCD 11. The variable dividing ratio of the dividing circuit 15 may be used in combination with an electronic shutter to adjust the information charge storing time when necessary.

In the preferred embodiment, the dividing circuit 15 provides the dividing clock DCK to the timing control circuit 14 in order to lengthen the vertical scan period. In this state, the cycle of the reference clock MCK received by the vertical drive circuit 12 is shorter than the cycle of the divisional clock DCK. Thus, the frequency of the vertical transfer clock $\phi$v is not decreased, and a smear increase that would be caused by a longer frame transfer time is prevented.

Instead of the frame transfer type CCD 11, the present invention may be applied to a frame interline transfer type CCD in which a vertical transfer portion is arranged between each row of light receiving pixels in the storing portion.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

What is claimed is:

1. A solid-state imaging apparatus comprising:
   a solid-state imaging device including a light receiving portion having a plurality of light receiving pixels, a storing portion arranged adjacent to the light receiving portion, and a horizontal transfer portion arranged adjacent to the storing portion;

a timing control circuit for dividing a first clock generated by a first clock generating circuit and having a predetermined cycle to generate a vertical scan timing signal and a horizontal scan timing signal;

a vertical drive circuit connected to the timing control circuit for generating a vertical transfer clock from a second clock, the cycle of which is shorter than the first clock, in accordance with the vertical scan timing signal, wherein the vertical transfer clock is used to transfer information charges accumulated in the light receiving pixels of the light receiving portion to the storing portion; and a horizontal drive circuit connected to the first clock generating circuit and the timing control circuit for generating a horizontal transfer clock from the first clock in accordance with the horizontal scan timing signal, wherein the horizontal transfer clock is used to output the information charges transferred from the storing portion to the horizontal transfer portion.

2. The solid-state imaging apparatus according to claim 1, wherein the first clock generating circuit is a dividing circuit connected to the timing control circuit for generating the first clock by dividing the second clock.

3. The solid-state imaging apparatus according to claim 2, wherein a dividing ratio of the second clock in the dividing circuit is variably set in accordance with the information charge storing time of the solid-state imaging device.

4. A method for driving a solid-state imaging device including a light receiving portion having a plurality of light receiving pixels, a storing portion arranged adjacent to the light receiving portion, and a horizontal transfer portion arranged adjacent to the storing portion, the method comprising the steps of:

dividing a reference clock with a predetermined dividing ratio to generate a divisional clock having a cycle longer than the cycle of the reference clock;

generating a vertical scan timing signal and a horizontal scan timing signal from the divisional clock;

generating a vertical transfer clock from the reference clock in accordance with the vertical scan timing signal;

providing the vertical transfer clock to the light receiving portion and the storing portion in order to transfer information charges accumulated in the light receiving pixels of the light receiving portion to the storing portion;

generating a horizontal transfer clock from the divisional clock in accordance with the horizontal scan timing signal; and providing the horizontal transfer clock to the horizontal transfer portion in order to output the information charges transferred from the storing portion to the horizontal transfer portion.

5. The driving method according to claim 4, further comprising a step of varying the predetermined dividing ratio in accordance with the information charge storing time of the solid-state imaging device.

* * * * *